(12) United States Patent
Kondo

(10) Patent No.: US 8,192,826 B2
(45) Date of Patent: Jun. 5, 2012

(54) HEXAGONAL CELL HONEYCOMB STRUCTURE BODY

(75) Inventor: Toshiharu Kondo, Toyoake (JP)

(73) Assignee: Denso Corporation, Kariya (JP)

( * ) Notice: Subject to any disclaimer, the term of this patent is extended or adjusted under 35 U.S.C. 154(b) by 400 days.

(21) Appl. No.: 12/557,754

(22) Filed: Sep. 11, 2009

(65) Prior Publication Data

US 2010/0062213 A1 Mar. 11, 2010

(30) Foreign Application Priority Data

Sep. 11, 2008 (JP) ................................. 2008-233570
Aug. 28, 2009 (JP) ................................. 2009-198228

(51) Int. Cl.
  *B32B 3/12* (2006.01)
  *B01D 53/34* (2006.01)
  *B01D 50/00* (2006.01)

(52) U.S. Cl. ........ 428/118; 428/116; 422/171; 422/180; 422/181; 422/182

(58) Field of Classification Search ................... 428/118
See application file for complete search history.

(56) References Cited

U.S. PATENT DOCUMENTS 6,159,578 A * 12/2000 Ichikawa ...................... 428/118
2006/0292393 A1 12/2006 Kunieda
2007/0065631 A1 3/2007 Sugiura et al.
2007/0148405 A1 * 6/2007 Segawa et al. ................ 428/118
2007/0148406 A1 6/2007 Ando et al.

FOREIGN PATENT DOCUMENTS

| JP | 2007-083099 | 4/2007 |
| JP | 2007-175571 | 7/2007 |
| JP | 2007-196212 | 8/2007 |
| WO | WO2006/070540 | 7/2006 |

OTHER PUBLICATIONS

Japanese Office Action dated Nov. 24, 2010 issued in corresponding Japanese Application No. 2009-198228 with English Translation.

* cited by examiner

*Primary Examiner* — Gordon R Baldwin
(74) *Attorney, Agent, or Firm* — Nixon & Vanderhye PC

(57) ABSTRACT

A hexagonal cell honeycomb structure body has cell walls arranged in a hexagonal shaped lattice, hexagonal shaped cells partitioned by the cell walls, and a skin layer with which the outside surface of the hexagonal cell honeycomb structure body is covered. An average thickness of basic cell walls is not more than 140 μm. A relationship of Dax/P≧0.13 is satisfied, where Dax is an average of diameters of inscribed circles, each of which is inscribed in a boundary part of three basic cell walls at a junction area between opening parts of adjacent three cells. On a cross sectional surface of the body, a surface of the basic cell wall has a concave part curved toward its inside direction, and an inside angle part of adjacent two basic cell walls has a curved shape, which smoothly connects the surfaces of the adjacent two basic cell walls.

5 Claims, 6 Drawing Sheets

(PRESENT INVENTION)

HEXAGONAL CELL HONEYCOMB STRUCTURE BODY

CROSS-REFERENCE TO RELATED APPLICATION

This application is related to and claims priority from Japanese Patent Applications No. 2008-233570 filed on Sep. 11, 2008, and No. 2009-198228 filed on Aug. 28, 2009, and the contents of which are hereby incorporated by reference.

BACKGROUND OF THE INVENTION

1. Field of the Invention

The present invention relates to a hexagonal cell honeycomb structure body for use as a catalyst support capable of supporting catalysts in an exhaust gas purifying device mounted to an internal combustion engine for vehicles, and purifying an exhaust gas emitted from an internal combustion engine such as a diesel engine.

2. Description of the Related Art

Recently, various types of an improved honeycomb structure body have been proposed, each of which is comprised of a plurality of cells partitioned by cell walls. Each of the cell walls has a reduced thickness in order to rapidly activate catalysts supported therein. Such a honeycomb structure body has a light weight and a reduced heat capacity because of having the cell walls of a reduced thickness, namely, a thin thickness. The honeycomb structure body acts as a catalyst support capable of supporting catalysts used in an exhaust gas purifying device such as a diesel particulate filter (DPF), for a diesel engine mounted on a vehicle.

In order to enhance or improve the performance of purifying an exhaust gas, a hexagonal honeycomb structure body having hexagonal shaped cells (hereinafter, referred to as the "hexagonal cell honeycomb structure body") is widely used because of being capable of uniformly supporting catalyst thereon, and allows the exhaust gas emitted from an internal combustion engine to be passing. The hexagonal cell honeycomb structure body having the above structure comprised of the hexagonal shaped cells can decrease its pressure loss because of allowing the exhaust gas to be smoothly passing therethrough.

However, the hexagonal cell honeycomb structure body as a catalyst support is usually accommodated or assembled in a cylindrical case to which a predetermined magnitude of pressure is applied from an outer peripheral side toward the inside of the hexagonal cell honeycomb structure body. Because the more the thickness of the cell walls in the hexagonal cell honeycomb structure body is decreased (for example, not more than 140 μm), the more the rigidity of the cell walls is decreased. This causes a problem to decrease a breaking strength (or a compressive fracture strength) of the hexagonal cell honeycomb structure body by the pressure applied from the outside of the hexagonal cell honeycomb structure body. (see the conventional patent document 1 described later)

In addition, it is generally difficult to avoid the generation of distortion in the cell walls during a shaping step, a drying step, and another step in the production process of the hexagonal cell honeycomb structure body. In particular, when the hexagonal cell honeycomb structure body is comprised of cell walls of not more than 140 μm thickness, there is a tendency to decrease its isostatic strength. This needs to take a measure to increase the isostatics strength.

Decreasing the breaking structure (or a compressive fracture strength) causes a serious problem in the hexagonal cell honeycomb structure body comprised of the hexagonal shaped cells rather than triangle shaped cells or square shaped cells.

There are various related art documents to increase or improve the strength of the entire of the hexagonal cell honeycomb structure body. For example, Japanese patent laid open publication No. JP 2007-196212 has disclosed a hexagonal cell honeycomb structure body which satisfies a relationship of $Da/P \geqq 0.13$, where Da is a diameter of an inscribed circle which is inscribed through the injection of adjacent cell walls, and P denotes a cell pitch. This conventional structure can maintain the breaking strength even if the thickness of each of the cell walls in a hexagonal cell honeycomb structure body is thin, for example, not more than 140 μm.

Although the conventional technique disclosed in the above conventional patent document JP 2007-196212 has an adequate breaking strength as a mechanical strength, the junction area between adjacent cell walls is increased, the total weight of the hexagonal cell honeycomb structure body is thereby increased. This also increases its heat capacity because of increasing its total weight. This deteriorates the performance of rapidly activating catalysts supported on the cell walls with which cells are formed in the hexagonal cell honeycomb structure body, and thereby makes it difficult to adequately show the feature of rapidly activating the catalysts with the thin structure of the cell walls.

SUMMARY OF THE INVENTION

It is an object of the present invention to provide a hexagonal cell honeycomb structure body, a structure of which can increase the breaking strength of the hexagonal cell honeycomb structure body, is capable of rapidly activating catalysts supported therein, increasing the performance of purifying an exhaust gas emitted from an internal combustion engine, and decreasing its pressure loss.

To achieve the above purposes, the present invention provides a hexagonal cell honeycomb structure body for use as a catalyst support capable of supporting catalysts capable of purifying an exhaust gas emitted from an internal combustion engine such as a diesel engine. The hexagonal cell honeycomb structure body has a plurality of cell walls arranged in a hexagonal shaped lattice, a plurality of cells, and a skin layer. For example, the skin layer has a cylindrical shape. Each of the cells is surrounded by the six cell walls (hereinafter, each of those cells will be referred to as the "hexagonal shaped cell".) The hexagonal cell honeycomb structure body is covered with the skin layer. In particular, an average thickness of each of six basic cell walls in the cell walls is not more than 140 μm, where the six basic cell walls form a substantial perfectly hexagonal shaped cell without including or using the skin layer. The hexagonal cell honeycomb structure body according to the present invention satisfies a relationship $Dax/P \geqq 0.13 \ldots (1)$, where P is a cell pitch P of the cells, and Dax is an average diameter of diameters of inscribed circles. Each of the inscribed circles is inscribed in a boundary part of opening parts of three cells, namely, at a junction area between adjacent three basic cells which form the three cells. A surface of the basic cell wall is concave, or has a curved shape toward the direction of the inside thereof, and an inside angle part formed between the adjacent two basic cell walls has a straight shape or a curved shape so that the surfaces of the adjacent two basic cell walls are smoothly connected to each other.

In addition to the features of having the thin cell walls and the average thickness of the basic cell wall of not more than 140 μm, satisfying the above relationship $Dax/P \geqq 0.13 \ldots (1)$ between the cell pitch P and the average diameter Dax can increase the breaking strength (for example, isostatic strength) of the entire of the hexagonal cell honeycomb structure body according to the present invention. In the relationship $Dax/P \geqq 0.13 \ldots (1)$, where P designates the cell pitch of the cells, and Dax is the average diameter of diameters of inscribed circles, each of the inscribed circles is inscribed in a boundary part of openings of three cells at a junction area between adjacent three basic cell walls.

That is, having the relationship (1) and the above features can increase the strength of the entire of the hexagonal cell honeycomb structure body. It is therefore possible to use the hexagonal cell honeycomb structure body according to the present invention as catalyst support in a practical use even if the hexagonal cell honeycomb structure body has such thin cell walls, where the catalyst support is capable of supporting catalysts to purify particulate matters (PM) contained in an exhaust gas emitted from an internal combustion engine such as a diesel engine.

Further, in the structure of the hexagonal cell honeycomb structure body according to the present invention, the surface of each of the basic cell walls is concave or has a curved shape which is curved toward the direction of the inside of the basic cell wall. This structure can decrease the total weight of the hexagonal cell honeycomb structure body because the surface of the basic cell wall has a concave or curved shape, and thereby decreases the heat capacity thereof, when compared with the structure in which the surface of the cell wall has a straight line shape (or, is flat). This can increase or improve the performance of rapidly activate catalysts.

Still further, because the volume and weight of the junction area between the basic cell walls becomes increased when satisfying the above relationship (1), the entire weight of the hexagonal cell honeycomb structure body also increases. However, such a drawback can be eliminated by the presence of the concave surface of the basic cell wall. This structure can provide the superior function of rapidly activating catalysts while maintaining the entire strength of the hexagonal cell honeycomb structure body.

Still further, because the surface of the basic cell wall has a curved shape or a concave shape, it is possible for the basic cell wall to have a large surface area when compared with that of the cell wall having a flat surface or a straight line surface in a conventional hexagonal cell honeycomb structure body. The structure of the present invention can therefore increase the exhaust gas purifying function with catalysts.

Still further, because the surface of the basic cell wall has a curved shape or a concave shape, it is possible to have a large opening area of the cell when compared with that of the cell in a conventional hexagonal cell honeycomb structure body. This structure of the present invention allows the exhaust gas to be smoothly passing therethrough, and can thereby decrease the pressure loss of the hexagonal cell honeycomb structure body.

Still further, according to the present invention, the inside angle parts of the adjacent two basic cell walls have the straight shape or a curved shape in order to smoothly connect the surfaces of the adjacent two basic cell walls. That is, the inside angle part is not formed with an angular shape, and smoothly connects the surfaces of the adjacent two basic cell walls to each other so that the connection area of the surfaces of the adjacent two basic cell walls has a convex shape. This structure of the connection area between the adjacent two basic cell walls can diffuse and relax the stress generated in the hexagonal cell honeycomb structure body. Therefore the structure of the present invention further increases the breaking strength of the hexagonal cell honeycomb structure body.

As described above, according to the present invention, it is possible to increase the strength of the hexagonal cell honeycomb structure body, and provide the hexagonal cell honeycomb structure body having the functions of rapidly activating catalysts, increasing the exhaust gas purifying function, and decreasing its pressure loss.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
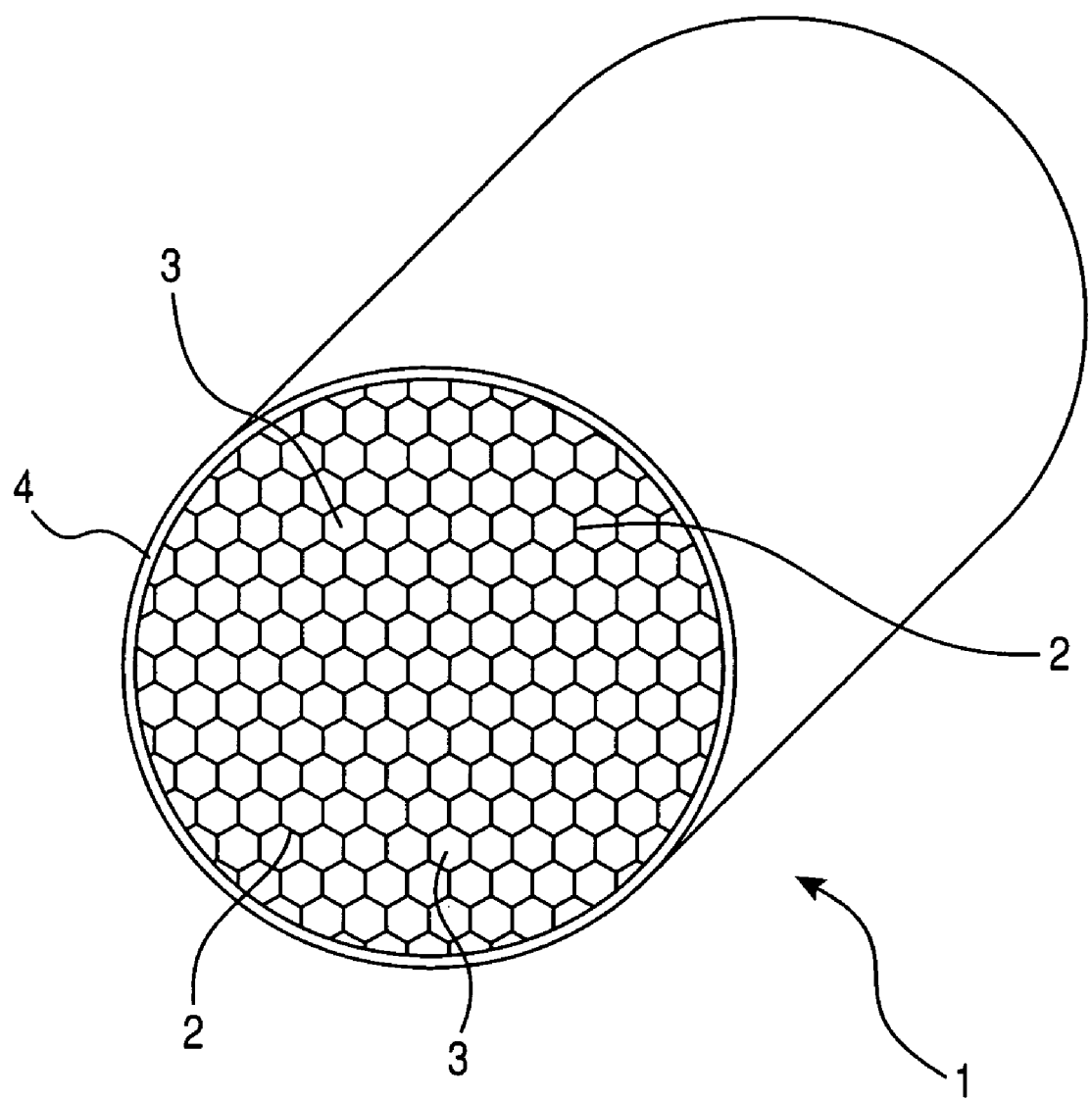
FIG. 1 is a perspective view showing a hexagonal cell honeycomb structure body according to embodiments of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of a hexagonal cell honeycomb structure body according to a first embodiment of the present invention with reference to FIG. 1 to FIG. 4.

FIG. 1 is a perspective view showing a hexagonal cell honeycomb structure body according to a first embodiment of the present invention;

As shown in FIG. 1, the hexagonal cell honeycomb structure body 1 according to the first embodiment is used as a catalyst support for supporting catalysts capable of purifying particulate matters contained in an exhaust gas emitted from an internal combustion engine of a vehicle such as a diesel vehicle. Such a catalyst support is used in a diesel particulate filter (DPF) mounted on an exhaust gas purifying apparatus in an exhaust gas passage from internal combustion engine.

The hexagonal cell honeycomb structure body 1 is comprised of a plurality of cell walls 2 arranged in a hexagonal shape lattice, a plurality of hexagonal shaped cells 3 partitioned by the cell walls 2, and a skin layer 4. Specifically, each of the hexagonal shaped cells 3 is formed by the six cell walls 2. In other words, the six cell walls 2 form each of the hexagonal shaped cells 3. The outer peripheral surface of the hexagonal cell honeycomb structure body 1 is covered with the skin layer 4.

Figure 2:
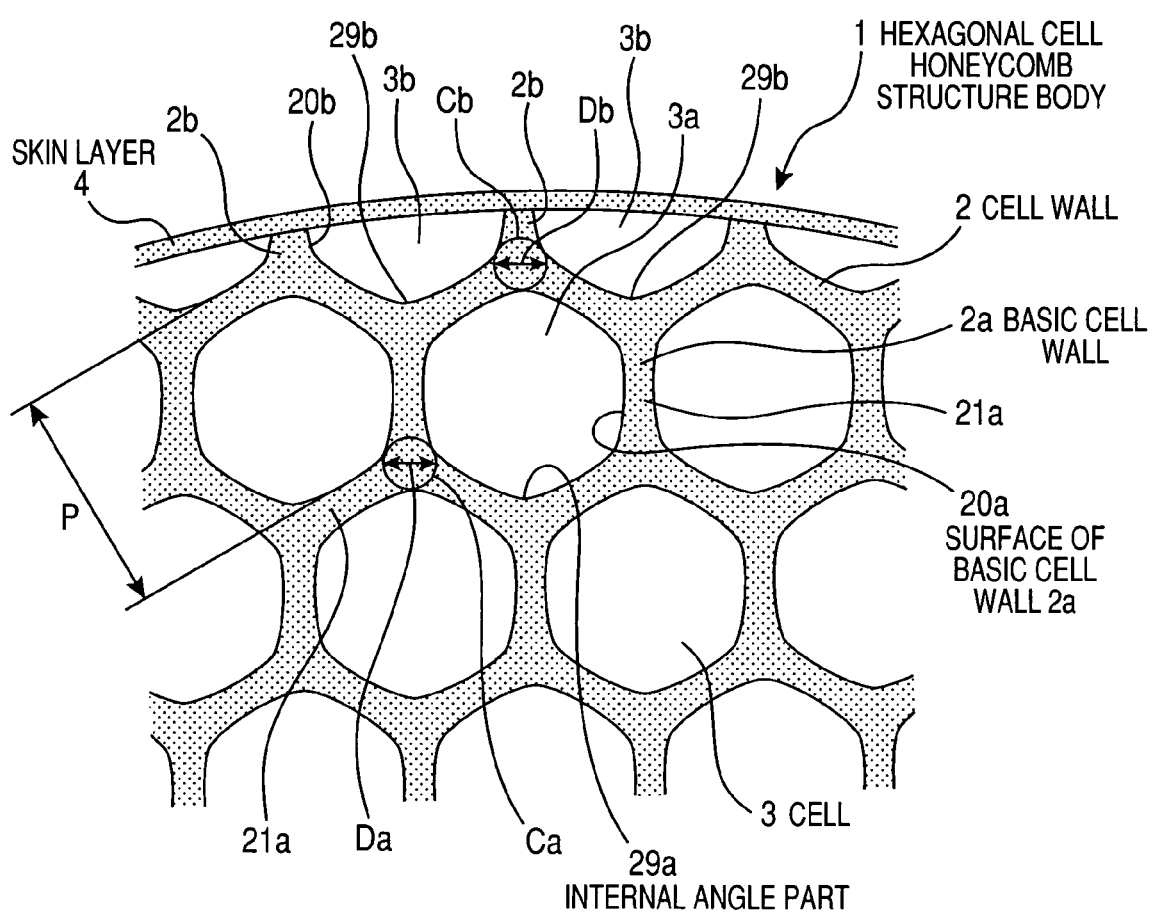
FIG. 2 is a view showing a part of a cross section of the hexagonal cell honeycomb structure body according to the first embodiment shown in FIG. 1.

FIG. 2 is a view showing a part of a cross section of the hexagonal cell honeycomb structure body 1 according to the first embodiment shown in FIG. 1. As shown in FIG. 2, on a surface of a cross section of the hexagonal cell honeycomb structure body 1, an average thickness T of basic cell walls 2a is not more than 140 µm, where the basic cell wall 2a is a cell wall as an element to form an approximately perfect hexagonal cell. That is, the six basic cell walls 2a form a cell 3a of an approximately perfect hexagonal shape by arranging the six basic cell walls 2a in a hexagonal shape without using the skin layer 4.

In addition, as shown in FIG. 2, the hexagonal cell honeycomb structure body 1 according to the first embodiment satisfies a relationship of $Dax/P \geq 0.13 \ldots (1)$, where Da is a diameter of an inscribed circle which is inscribed at a boundary area of openings of three cells, that is, at a junction area of adjacent three basic cell walls 2a, Dax is an average value of diameters Da of the inscribed circles Ca at all of the junction areas, and P indicates a cell pitch.

In the structure of the hexagonal cell honeycomb structure body 1 according to the first embodiment, the cell pitch P is a thickness of a minimum thickness part of the basic cell wall 2a.

Further, as shown in FIG. 2, the structure of the hexagonal cell honeycomb structure body 1 according to the first embodiment satisfies a relationship of $Dbx/Dax \geq 1.05 \ldots (2)$ is satisfied, where Dax is the average value of the diameters of the inscribed circles Ca previously described, and Dbx is an average value of diameters Db of the inscribed circles Cb which are inscribed at the boundary part of opening parts of cells, (a) at a junction area between most outside peripheral cell walls 2b closed of the skin layer 4, each of the most outside peripheral cell walls 2b and the skin layer 4 form an approximately imperfect hexagonal shaped cell 3b, or (b) at a junction area between the most outside peripheral cell walls 2b and the basic cell walls 2a which form an approximately imperfect hexagonal shaped cell 3b.

Figure 3:
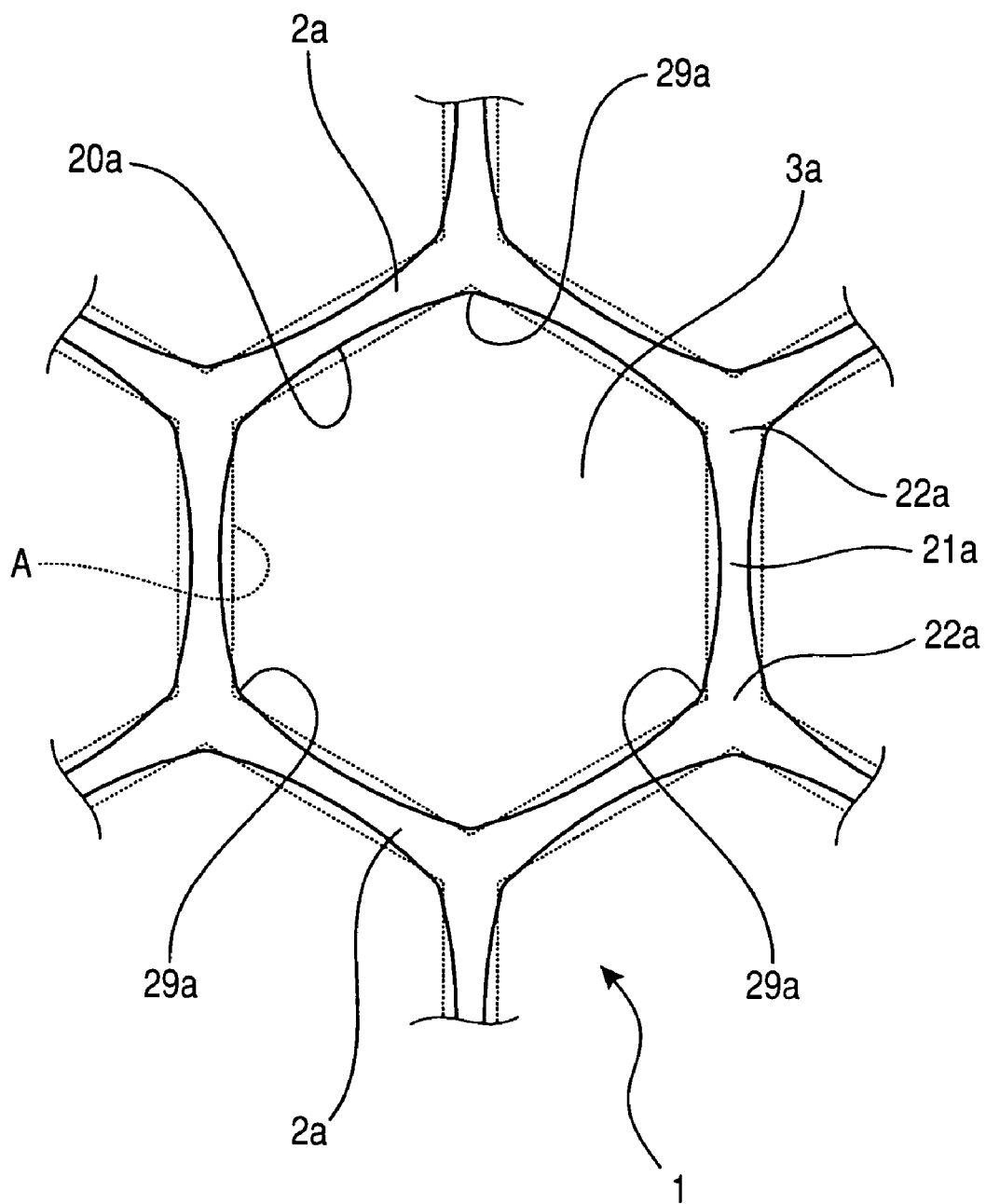
FIG. 3 is an enlarged view showing one hexagonal shaped cell having an approximately perfect hexagonal shape in the hexagonal cell honeycomb structure body according to the first embodiment.

FIG. 3 is an enlarged view showing one hexagonal shaped cell 3a having an perfect hexagonal shape in the hexagonal cell honeycomb structure body 1 according to the first embodiment.

As shown in FIG. 2 and FIG. 3, a surface 20a of each of the basic cell walls 2a is concave or has a curved surface when observed from the central point of the hexagonal shaped cell 3a toward the direction of the inside of the basic cell wall 2a. That is, as shown in FIG. 3, each of the basic cell walls 2a has a curved shape which is concave toward the inside of each of the basic cell walls 2a. When the average value Dax and the cell pitch P satisfy the above relationships (1) and (2), the surface of the basic cell wall 2a has a straight shape as a hypothetical line A (designated by dotted lines shown in FIG. 3), the surface 20a of each of the basic cell walls 2a is positioned at the inside area of the basic cell wall 2a observed from the hypothetical line A (toward the direction observed from the central point of the hexagonal shaped cell 3a to the basic cell wall 2a side).

Still further, in the first embodiment shown in FIG. 2 and FIG. 3, the surface of the basic cell wall 2a has a curved shape which is concave toward the inside of the basic cell wall 2a. The surface 20a of the basic cell wall 2a is a rounded surface (or a R surface) having a radius of curvature "r" within a range of 1.0 to 32 mm. As shown in FIG. 3, the thickness T1 of a minimum thickness part 21a in the basic cell wall 2a is not less than 40 µm. Still further, the thickness T1 of the minimum thickness part 21a is not more than 90% of a thickness T2 of a maximum thickness part 22a in the basic cell wall 2a.

As shown in FIG. 2 and FIG. 3, an inside angle part 29a between the adjacent two basic cells walls 2a has a curved shape with which the surfaces 20a of the adjacent two basic cell walls 2a are smoothly connected.

As shown in FIG. 3, it is so formed that the inside angle part 29a is positioned at the outside of the hypothetical line A (toward the direction of the central point of the hexagonal shaped cell 3a). In other words, the inside angle part 29a has a swollen part (or a convex part) toward the direction of the central point of the hexagonal shaped cell 3a.

In the structure of the hexagonal cell honeycomb structure body 1 according to the first embodiment, the inside angle part 29a has a rounded surface of a circular arc shape having a radius of curvature within a range of 0.1 to 0.4 mm.

As shown in FIG. 2, the most outside peripheral cell walls 2b have the same shape of the basic cell wall 2a. That is, the surface 20b of the most outside peripheral cell walls 2b has the same shape of the surface 20a of the basic cell wall 2. Further, the inside angle part 29b between the adjacent two most outside peripheral cell walls 2b has the same shape of the inside angle part 29a between the adjacent two basic cell walls 2a.

The hexagonal cell honeycomb structure body 1 according to the first embodiment is made of ceramic cordierite. In the hexagonal cell honeycomb structure body 1 according to the first embodiment, a sum total of volume of pores of not less than 40 µm diameter per unit weight is not more than 0.02 $cm^3/g$.

It is possible to detect the average thickness T of the basic cell wall 2a in the hexagonal cell honeycomb structure body 1 by the following method.

Figure 4:
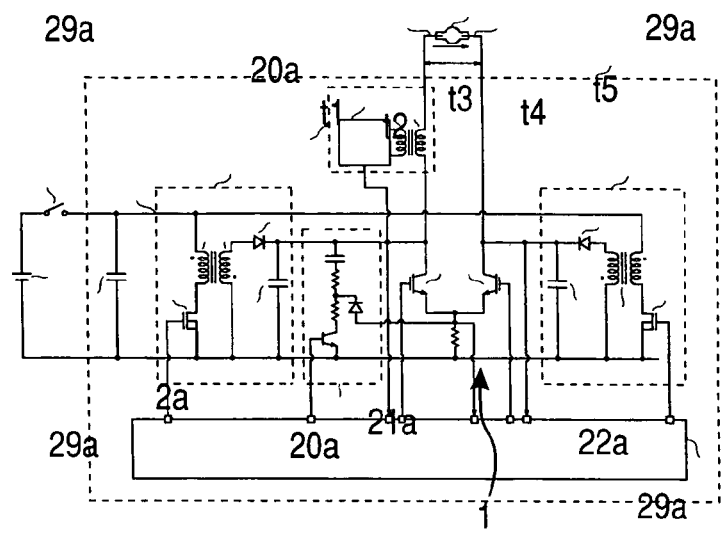
FIG. 4 is a view explaining a method of calculating an average thickness of a basic cell wall in the hexagonal cell honeycomb structure body according to the first embodiment.

FIG. 4 is an explanatory view showing the method of calculating the average thickness T of the basic cell wall 2a in the hexagonal cell honeycomb structure body 1 according to the first embodiment.

As shown in FIG. 4, the method firstly detects five thicknesses t1, t2, t3, t4, and t5 at five points between the minimum thickness part 21a at the central area of the basic cell wall 2a and the maximum thickness part 22a at a connection area connecting the surface 20a of the basic cell wall 2a to the inside angle part 29a. The thickness t1 is the same of the thickness T1 of the minimum thickness part 21a. The thickness t5 is the same of the thickness T2 of the maximum thickness part 22a.

The method then calculates an average thickness $T=(t1+t2+t3+t4+t5)/5$ of the basic cell wall 2a.

A description will now be given of the method of producing the hexagonal cell honeycomb structure body 1 according to the first embodiment of the present invention.

The method of producing hexagonal cell honeycomb structure body 1 according to the first embodiment is comprised of at least an extrusion molding step, a cutting step, a drying step, and a firing step. In particular, the extrusion molding step uses an extrusion molding die (not shown) having a plurality of slit grooves which are arranged corresponding to the shape of the arrangement of the cell walls 2 in the hexagonal cell honeycomb structure body 1.

In the extrusion molding step, at first, ceramic raw material powder is prepared. The ceramic raw material powder is mainly composed of kaolin, fused silica, and aluminum hydroxide, alumina, and talc to satisfy the chemical composition of cordierite is $SiO_2$: 45 to 55 wt %, $Al_2O_3$: 33 to 42 wt %, and MgO: 12 to 18 wt %.

Water, ceramics binder, and others of a predetermined amount are added into the ceramic raw material powder, and then mixed together in order to make the ceramic raw material.

The obtained ceramic raw material is extruded using the extrusion molding die to produce a hexagonal cell honeycomb structure body.

In the cutting step, the shaped body having a honeycomb structure is cut into a plurality of parts of a predetermined length.

In the drying step, the honeycomb structure bodies as green bodies are dried at a temperature within a range of 90 to 100° C.

In the firing step, the dried honeycomb structure bodies are fired at a maximum temperature of 1400° C. After completion of the firing step, the hexagonal cell honeycomb structure body 1 according to the first embodiment of the present invention is produced.

Next, a description will now be given of the action and effects of the hexagonal cell honeycomb structure body 1 according to the first embodiment of the present invention.

The hexagonal cell honeycomb structure body 1 according to the first embodiment of the present invention has the thin basic cells 3 which are mainly formed by the basic cell walls 2a, and the average thickness of the basic cell walls 2a is not more than 140 μm. In particular, the hexagonal cell honeycomb structure body 1 satisfies the relationship of $Dax/P \geq 0.13$ ... (1), where Dax is the average diameter of diameters Da of inscribed circles Ca, and each of the inscribed circles Ca is inscribed in a boundary part of openings of adjacent three cells 3, namely, at a junction area between adjacent three basic cell walls 2a, and P designates the cell pitch of the cells 3. This structure of the hexagonal cell honeycomb structure body 1 satisfying the relationship (1) can increase the breaking strength (for example, isostatic strength). That is, satisfying the relationship (1) can increase the strength at the junction area of the three basic cell walls 2a, and as a result, enhance the entire strength (for example, isostatic strength) of the hexagonal cell honeycomb structure body 1.

Further, in the structure of the hexagonal cell honeycomb structure body 1 according to the first embodiment of the present invention, the surface of the basic cell wall 2a is concave, namely, has a curved shape which is concave toward the direction of the inside of the basic cell wall 2a (toward the direction separated from the central point of the hexagonal shaped cell 3a). This structure decreases the weight and heat capacity of the hexagonal cell honeycomb structure body 1 when compared with those of a hexagonal cell honeycomb structure body in which the surface of each of the cell walls has approximately a straight-line shape. It is thereby possible to increase the performance of rapidly activating catalysts supported on the cell walls of the hexagonal cell honeycomb structure body 1.

The above feature of the hexagonal cell honeycomb structure body 1 according to the first embodiment of the present invention can suppress the deterioration even if the total weight of the hexagonal cell honeycomb structure body 1 is increased when the thickness of the junction area between the adjacent basic cell walls 2a is increased in order to satisfy the relationship (1). This structure makes it possible to increase the performance of rapidly activating the catalysts supported in the hexagonal cell honeycomb structure body 1 while maintaining the mechanical strength of the hexagonal cell honeycomb structure body 1.

Still further, because the surface 20a of the basic cell wall 2a has a curved shape (or a concave shape), it is possible to increase the surface area of the basic cell wall 2a when compared with that of the cell wall having approximately a straight shaped surface. That is, this structure of the basic cell walls 2a in the hexagonal cell honeycomb structure body 1 can increase the total area to support catalysts, and it is thereby possible for the hexagonal cell honeycomb structure body 1 to increase the performance of purifying the exhaust gas emitted from an internal combustion engine.

In addition, because the surface 20a of the basic cell wall 2a has a curved shape (or a concaved shape), it is possible to increase the area of the opening part of each of the cells 3 when compared with that of the cell wall having a straight-line shaped surface. That is, the structure of the basic cell walls 2a in the hexagonal cell honeycomb structure body 1 allows an exhaust gas emitted from an internal combustion engine to be smoothly passing, and thereby decrease its pressure loss through the cells 3 in the hexagonal cell honeycomb structure body 1.

Still further, in the structure of the hexagonal cell honeycomb structure body 1, the inside angle parts 29a of the adjacent two basic cell walls 2a are smoothly connected to each other so that those inside angle parts 29a make a smoothly curved shape. That is, the inside angle part 29a does not have an angular shape, but, smoothly connect the surfaces 20a of the adjacent two basic cell walls 2a to make a curved shape so that the connection part of the inside angle parts 29a makes a convex shape toward the direction of the central point of the hexagonal shaped cell 3a. This structure of the inside angle parts 29a of the surfaces 20a of the adjacent two basic cell walls 2a can diffuse and relax the stress generated in the hexagonal cell honeycomb structure body 1.

Still further, in the structure of the hexagonal cell honeycomb structure body 1 according to the first embodiment of the present invention, the surface 20a of the basic cell wall 2a has a rounded surface (R surface) of a circular arc shape having a radius of curvature within a range of 1.0 to 3.2 mm. In addition, the inside angle parts 29a has a rounded surface of a circular arc shape having a radius of curvature within a range of 0.1 to 0.4 mm. Still further, the sum total of the volume of pores of not less than 40 μm diameter in the hexagonal cell honeycomb structure body 1 is not more than 0.02 $cm^3/g$. This structure of the hexagonal cell honeycomb structure body 1 according to the first embodiment can provide the effects of the present invention such as increasing the strength such as isostatic strength of the hexagonal cell honeycomb structure body 1, providing the function of rapidly activating catalysts, increasing the performance of purifying an exhaust gas by the activated catalysts, and decreasing its pressure loss.

Furthermore, in the structure of the hexagonal cell honeycomb structure body 1 according to the first embodiment, the thickness T1 of the minimum thickness part in the basic cell wall 2a is not less than 40 μm. This structure can adequately maintain the strength of the basic cell wall 2a, and thereby maintain the entire strength of the hexagonal cell honeycomb structure body 1. Still further, it is possible to have an adequate width of a slit groove in a metal die to be used in an extrusion molding step of molding the hexagonal cell honeycomb structure body 1. This can mold the hexagonal cell honeycomb structure body 1 with high accuracy.

Further, the structure of the hexagonal cell honeycomb structure body 1 according to the first embodiment satisfies the relationship of Dbx/Dax≧1.05 . . . (2), where Dax is the average value of the diameters of the inscribed circles previously described, and Dbx is an average value of diameters Db of inscribed circles Cb which are inscribed at the boundary area of opening parts of cells, (a) at a junction area between most outside peripheral cell walls 2b closed of the skin layer 4, each of the most outside peripheral cell walls 2b and the skin layer 4 form an approximately imperfect hexagonal shaped cell, or (b) at a junction area between the most outside peripheral cell walls 2a and the basic cell walls 2a which an approximately imperfect hexagonal shaped cell.

This structure further increases the entire breaking strength of the hexagonal cell honeycomb structure body 1. The structure of the hexagonal cell honeycomb structure body 1 satisfying the relationship Dbx/Dax≧1.05 . . . (2), can increase the strength of the most outside periphery side of the cell walls rather than that of the cell walls at the inside area of the hexagonal cell honeycomb structure body 1. Improving or increasing the strength of the most outside periphery of the hexagonal cell honeycomb structure body 1 drastically contributes the increase of the entire strength of the hexagonal cell honeycomb structure body 1, and as a result, this can thereby increase the breaking strength of the hexagonal cell honeycomb structure body 1.

Moreover, the most outside peripheral cell walls 2b has the same shape as the basic cell walls 2a. That is, the surface 20b of the most outside peripheral cell walls 2b has the same shape of the surface 20a of the basic cell wall 2. Further, the inside angle parts 29b between the adjacent two most outside peripheral cell walls 2b has the same shape of the inside angle part 29a between the adjacent two basic cell walls 2a. Accordingly, this structure allows the most outside peripheral cell walls 2b to also rapidly activate catalysts, like the basic cell walls 2a, and to improve the performance of purifying exhaust gas using the catalysts, and to reduce its pressure loss at the most outside peripheral cell walls 2b in addition to those effects of the basic cell walls 2a arranged in the inside of the hexagonal cell honeycomb structure body 1.

As described above in detail, the first embodiment of the present invention can provide the hexagonal cell honeycomb structure body 1 with increased strength such as isostatic strength capable of rapidly activating catalysts supported on the cell walls, improving the function of purifying exhaust gas using the catalysts, and reducing the pressure loss.

Second Embodiment

A description will be given of the second embodiment of the present invention with reference to Table 1.

The second embodiment evaluated the characteristics of the hexagonal cell honeycomb structure body according to the present invention. At first, the evaluation prepared samples E11 to E13 as the hexagonal cell honeycomb structure body according to the present invention, and comparison samples C11 to C13 as a conventional hexagonal cell honeycomb structure body.

The opening area of each of the samples E11 to E13 and the comparison samples C11 to C13 was detected.

Each of the samples E11 to E13 basically has the same structure of the hexagonal cell honeycomb structure body 1 according to the first embodiment of the present invention.

Each of the comparison samples C11 to C13 satisfied the relationship of Dax/P≧0.13 . . . (1), where Dax designates the average value of diameters of inscribed circles at a junction area between adjacent cells, and P indicates a cell pitch. In the comparison samples C11 to C13, the surface of each of the cell walls is a straight shape (see the hypothetical line A designated by dotted lines in FIG. 3). That is, the junction area of the cell walls between the adjacent cells in each of the comparison samples C11 to C13 has an increased strength in order to increase the entire strength of the comparison samples C11 to C13.

Table 1 shows the detection results such as Mill/Mesh, a thickness T1 of the minimum thickness part of the cell wall, Radius R1 (mm) of curvature of an inscribed circle, and opening area (mm$^2$) of the samples E11 to E13 and the comparison samples C11 to C13. In Table 1, "Mill" designates the thickness of a cell wall which is shown in 1/1000 inches, and "Mesh" denotes the number of cells in square inch. The radius R1 (mm) of curvature designates a radius of curvature of the surface of the basic cell wall.

Table 1 show the detection results of the opening area of each of the samples E11 to E13, and C11 to C13.

TABLE 1

|     | Mill/Mesh | Thickness T1 (μm) of minimum thickness part | Radius R1 (mm) of Curvature | Opening area (mm$^2$) |
| --- | --- | --- | --- | --- |
| E11 | 6/400 | 130 | 2.35 | 1.26521 |
| C11 | 6/400 | — | — | 1.24779 |
| E12 | 3.5/600 | 65 | 1.15 | 0.898131 |
| C12 | 3.5/600 | — | — | 0.880856 |
| E13 | 2.5/750 | 37 | 0.82 | 0.754164 |
| C13 | 2.5/750 | — | — | 0.736944 |

As can be understood from, each of the sample E11 to E13 according to the present invention has a large opening area rather than that of the comparison samples C11 to C13. The detection results in Table 1 show that the hexagonal cell honeycomb structure body (E11, E12, and E13) according to the present invention allows an exhaust gas emitted from an internal combustion engine to be smoothly passing, and decreases its pressure loss because the surface of each of the basic cell walls of the samples E11 to E13 has a curved shape (as a circular arc shape) which is concave toward the direction of the inside of the basic cell wall, and this allows each of the samples E11 to E13 to have a large opening area.

Third Embodiment

A description will be given of the third embodiment according to the present invention with reference to Table 2.

The third embodiment evaluated the characteristics of the hexagonal cell honeycomb structure body 1 according to the present invention.

At first, the evaluation prepared four hexagonal cell honeycomb structure bodies E21 and E22 according to the present embodiment of the present invention, and C21 and C22 as comparison sample which have different dimensions, and detected isostatic strength and weight of each of the samples E21, E22, and the comparison samples C21, and C22.

The samples E21 and E22 are the hexagonal cell honeycomb structure bodies basically having the same structure of the hexagonal cell honeycomb structure body according to the first embodiment.

The comparison sample C21 had a hexagonal cell honeycomb structure body having cell walls, a surface of each of which has a straight line shape, which is commonly used in conventional hexagonal cell honeycomb structure bodies.

The comparison sample C22 satisfies the relationship of $Dax/P \geq 0.13$, where Dax is an average diameter, and P is a cell pitch, and a surface of each of cell walls had a straight line shape.

Table 2 shows the detection results of dimensions of various parts of those samples E21, E22, and the comparison samples C21, C22. In particular, the hexagonal cell honeycomb structure body of each of those samples E21, E22, C21 and C22 had the same shape (the diameter of 103 mm, and the cylindrical shape of 105 mm length) of the hexagonal cell honeycomb structure body used in the second embodiment shown in Table 1.

In those samples E21, E22, C21 and C22, an inside angle part of adjacent two basic cell walls has a radius of curvature of 0.25 mm (the radius R2 of curvature, described later in detail).

The isostatic strength of each of the sample E21 and E22, and the comparison samples C21 and C22 used in the third embodiment was detected based on the method determined by JASO-M 505-87 (Japanese Automobile Standards Organization: Material and surface treatment M505-87) while applying a hydrostatic pressure to the hexagonal cell honeycomb structure body as each of those samples E21, E22, C21 and C22.

In Table 2, character "⊚" designates the isostatic strength of not less than 3.5 MPa, character "○" indicates the isostatic strength within a range of not less than 1.5 MPa and less than 3.5 MPa, Δ denotes the isostatic strength within a range of not less than 1.0 MPa and less than 1.5 MPa, and character "X" indicates the isostatic strength of less than 1.0 MPa.

Table 2 shows the detection results of the weight (g) and the isostatic strength (MPa) of each of the samples E21, E22, C21 and C22.

the conventional case (the comparison sample C21), this is not a problem in practical use. Accordingly, the sample E22 can also provide the performance of rapidly activating catalysts.

On the other hand, because not satisfying the relationship of $Dax/P \geq 0.13$, the sample C21 has not an adequate isostatic strength (designated by the reference character "X").

Although the comparison sample C22 has an adequate isostatic strength because of satisfying the relationship of $Dax/P \geq 0.13$ (designated by the reference character "○"), the comparison sample C22 has a heavy weight because of having cell walls of a straight shaped surface (namely, having no radius R1 of curvature). That is, the comparison sample C22 has a disadvantage in views of the function of rapidly activating catalysts.

As can be understood from the detection results shown in Table 2, even if a hexagonal cell honeycomb structure body has basic cell walls having not more than 140 μm, it is possible to increase the entire strength of the hexagonal cell honeycomb structure body by satisfying the relationship of $Dax/P \geq 0.13$, where P is the cell pitch P, and Dax is the average diameter of diameters Da of inscribed circles, and each of the inscribed circles is inscribed in a boundary part of opening parts of three cells, namely, at a junction between adjacent three basic cell walls. This structure of the hexagonal cell honeycomb structure body has an adequate strength in practical use when the hexagonal cell honeycomb structure body is used as a catalyst support capable of supporting catalysts in an exhaust gas purifying apparatus such as a DPF (Diesel Particulate Filter).

Still further, satisfying the relationship of $Dbx/Dax \geq 1.05$ . . . (2) further increases the entire strength of the hexagonal cell honeycomb structure body because of increasing the strength of the most outside peripheral side, where Dax is the average value of the diameters of the inscribed circles, and

TABLE 2

| | Cell Pitch P (mm) | Average thickness T (μm) of basic cell walls | Thickness T1 (μm) of minimum thickness part | Radius R1 (mm) of curvature | Dax (mm) | Dbx (mm) | Dax/P | Dbx/Dax | Weight (g) | Isostatic strength (MPa) | Judgment |
|---|---|---|---|---|---|---|---|---|---|---|---|
| E21 | 1.11 | 77 | 65 | 1.15 | 0.14 | 0.13 | 0.136 | 0.93 | 245 | 3.1 | ○ |
| E22 | 1.11 | 77 | 65 | 1.15 | 0.14 | 0.15 | 0.136 | 1.05 | 250 | 4.3 | ⊚ |
| C21 | 1.11 | 100 | 100 | — | 0.13 | 0.12 | 0.118 | 0.92 | 245 | 0.8 | X |
| C22 | 1.11 | 100 | 100 | — | 0.14 | 0.13 | 0.136 | 0.93 | 260 | 3.3 | ○ |

As can be understood from the detection results of Table 2, the sample E21 satisfies the relationship of $Dax/P \geq 0.13$ (having a large junction area between basic cell walls has a large area), and has basic cell walls of the concave shape (satisfying the radius R1 of curvature), and the surface of the basic cell wall is concave toward the direction of the inside of the basic cell wall. This structure of the sample E21 has an adequate and improved isostatic strength (designated by the reference character "○"). Because the weight (g) of the sample E21 has approximately equal to the comparison sample C21, the sample E21 has the performance of rapidly activating catalysts.

Because the sample E22 further satisfies the relationship of $Dax/P \geq 1.05$ in addition to having the feature of the sample E21 described above, that is, the sample E22 has an increases strength at the outer peripheral area when compared with the sample E21. The sample E22 has a superior isostatic strength (designated by the reference character "⊚"). Although the weight of the sample E22 is slightly heavy rather than that of Dbx is the average value of diameters Db of inscribed circles which are inscribed at the boundary area of opening parts of cells, (a) at a junction area between most outside peripheral cell walls closed of the skin layer, or (b) at a junction area between the most outside peripheral cell walls and the basic cell walls.

Fourth Embodiment

A description will be given of the fourth embodiment according to the present invention with reference to Table 3.

The fourth embodiment prepared and detected the characteristics such as isostatic strength of each of samples E31, E32, E41, E42, E51, E52 according to the present invention, and comparison samples C31, C32, C41, C42, C51, and C52. Those samples had different dimensions.

Table 3 shows such dimensions of each of the samples E31, E32, E41, E42, E51, E52, and the comparison samples C31, C32, C41, C42, C51, and C52.

In Table 3, the radius R1 (mm) of curvature designates a radius of curvature of the surface of the basic cell wall, the radius R2 (mm) of curvature indicates a radius of curvature of the inside angle part, and the volume of pores designates a total volume of pores of not less than 40 μm diameter per unit weight.

In particular, the hexagonal cell honeycomb structure body of each of those samples E31, E32, E41, E42, E51, E52 and C31, C32, C41, C42, C51, and C52 had the same shape (having 103 mm diameter, a cylindrical shape of 105 mm length) of the samples used in the second embodiment.

On preparing raw materials of each of the samples E31, E32, E41, E42, E51, E52, and C32, C42, and C52, coarse particles of not less than 45 μm diameter in raw materials were eliminated in advance by using a separator in order to avoid increasing pores of not less than 40 μm diameter (so that a total volume of pores of not less than 40 μm diameter becomes not more than 0.02 cm$^3$/g). The hexagonal cell honeycomb structure bodies of those samples were made using this raw material.

The fourth embodiment detects the isostatic strength of those samples by the same method of the third embodiment prescribed above, and then judges the conditions of the samples.

Table 3 shows the detection results of the isostatic strength of those samples E31, E32, E41, E42, E51, and E52, and the comparison samples C31, C32, C41, C42, C51, and C52.

TABLE 3

| | Cell Pitch P (mm) | Average thickness T (μm) of basic cell walls | Radius R1 (mm) of curvature | Radius R2 (mm) of curvature | Volume (cm$^3$/g) of pores | Isostatic strength (MPa) | Judgment |
|---|---|---|---|---|---|---|---|
| E31 | 1.00 | 53 | 12.1 | 0.1 | 0.02 | 4.2 | ⊚ |
| E32 | 1.00 | 53 | 1.0 | 0.25 | 0.02 | 4.4 | ⊚ |
| C31 | 1.00 | 53 | 12.1 | 0.1 | 0.04 | 1.3 | Δ |
| C32 | 1.00 | 53 | — | 0.07 | 0.02 | 0.9 | X |
| E41 | 1.11 | 77 | 17.5 | 0.1 | 0.02 | 4.2 | ⊚ |
| E42 | 1.11 | 77 | 1.0 | 0.3 | 0.02 | 4.3 | ⊚ |
| C41 | 1.11 | 77 | 17.5 | 0.1 | 0.04 | 1.4 | Δ |
| C42 | 1.11 | 77 | — | 0.07 | 0.02 | 0.9 | X |
| E51 | 1.36 | 100 | 31.5 | 0.1 | 0.02 | 4.3 | ⊚ |
| E52 | 1.36 | 100 | 1.0 | 0.4 | 0.02 | 4.3 | ⊚ |
| C51 | 1.36 | 100 | 31.5 | 0.1 | 0.04 | 1.4 | Δ |
| C52 | 1.36 | 100 | — | 0.07 | 0.02 | 0.9 | X |

As can be understood from the detection results shown in Table 3, the surface of the basic cell in each of the samples E31, E32, E41, E42, E51, and E52 has the radius R1 of curvature within a range of 1 to 32 mm. The inside angle part of those samples E41, E42, E51, and E52 has the radius R2 of curvature within a range of 0.1 to 0.4 mm, and the total volume of pores of not less than 40 μm is not more than 0.02 cm$^3$/g. Therefore those samples E31, E32, E41, E42, E51, and E52 adequately have an allowable magnitude of isostatic strength (as designated by the reference character "⊚").

On the other hand, although satisfying the radius of curvature R1 and R2 within the above ranges R1, and R2 (where, R1 is within the range of 1 to 32 mm, and R2 is within the range of 0.1 to 0.4 mm) because each of the comparison samples C31, C41, and C51 has an excess volume of pores of more than 0.02 cm$^3$/g, each of the comparison samples C31, C41, and C51 has a low isostatis strength (designated by the reference character "Δ") when compared with that of each of the samples E31, E32, E41, E42, E51, and E52.

On the other hand, because of not having the radius R2 of curvature, each of the comparison samples C32, C42, and C52 has an inadequate magnitude of isostatistic strength (designated by the reference character "X").

It can be understood from the detection results shown in Table 3, it is preferred for the surface of the basic cell wall to have the radius of curvature within a range of 1 to 32 mm, for the inside angle part to have the radius of curvature within a range of 0.1 to 0.4 mm, and for the total volume of pores of not less than 40 μm to have a range of not more than 0.02 cm$^3$/g.

The hexagonal cell honeycomb structure body having the above structure according to the present invention has an adequate magnitude of isostatic strength in practical use, and can be used as a catalyst support for supporting catalysts to purify an exhaust gas.

Fifth Embodiment

A description will be given of the fourth embodiment according to the present invention with reference to FIG. 5 and FIG. 6.

The fifth embodiment detected the characteristics of the hexagonal cell honeycomb structure body according to the present invention, At first, the fifth embodiment prepared the samples of the hexagonal cell honeycomb structure body having different thickness T1 of the minimum thickness part of the basic cell wall, and detected the compressive fracture strength (or a breaking strength) of the samples.

In the fifth embodiment, the compressive fracture strength of each of the samples was detected by the following procedures.

First, the hexagonal cell honeycomb structure body which basically having the same structure of the first embodiment (shown in FIG. 1) was prepared. The cell pitch P of the hexagonal cell honeycomb structure body was 1.36 mm.

Figure 5:
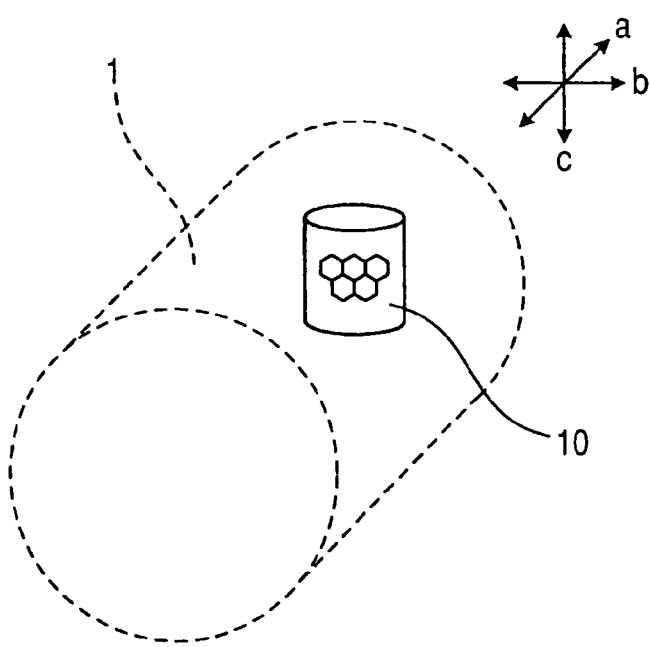
FIG. 5 is a view explaining an example to detect a compressive fracture strength according to a fifth embodiment of the present invention.

Next, as shown in FIG. 5, the hexagonal cell honeycomb structure body was cut to make a plurality of samples 10 of a cylindrical shape having a diameter of Φ=1 inch and a length of L=1 inch so that the longitudinal direction of the hexagonal cell honeycomb structure body became a-axis, and the longitudinal direction of the sample 10 became c-axis.

The compressive fracture strength in c-axis of each of samples 10 was detected while compressing the samples 10 to the c-axis direction by using an Autograph manufactured by Instron Ltd.

Figure 6:
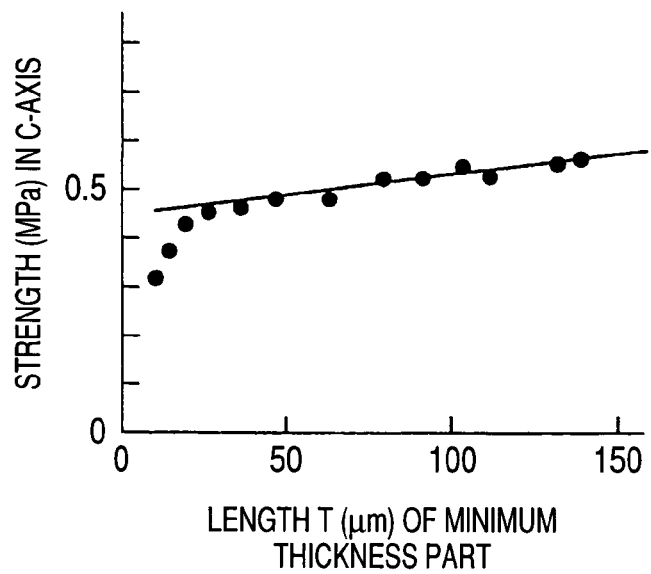
FIG. 6 is an explanatory view showing a relationship between a thickness of a minimum thickness part and a compressive fracture strength in c-axis of a basic cell wall in the hexagonal cell honeycomb structure body according to the fifth embodiment of the present invention.

FIG. 6 is an explanatory view showing a relationship between a thickness T1 of a minimum thickness part and a compressive fracture strength (or a compressive fracture) in c-axis of the basic cell wall in the hexagonal cell honeycomb structure body according to the fifth embodiment of the present invention.

As can be understood from the detection results shown in FIG. 6, when the thickness T1 of the minimum thickness part of the cell wall is less than 40 μm, there is a tendency of drastically decreasing the compressive fracture strength in c-axis. It means that this makes it difficult to mold the hexagonal cell honeycomb structure body with high accuracy because the slit width of an extrusion die made of metal is narrow, and it is thereby difficult to feed an adequate amount of raw material. This decreases the strength of the shaped body.

As a result, it is preferred for the hexagonal cell honeycomb structure body according to the present invention to have the minimum thickness part of the thickness T1 of not less than 40 μm. The hexagonal cell honeycomb structure body having this structure can be used as catalyst support capable of supporting catalyst to purify an exhaust gas in practice use.

OTHER FEATURES AND EFFECTS OF THE PRESENT INVENTION

Through the description and the drawings according to the present invention, the technical phrase the "approximately perfect hexagonal shape" does not indicate a hexagonal shape in a geometrical field, but means a hexagonal shape obtained by combining or arranging six cell walls. In a concrete example of the hexagonal cell honeycomb structure body, each of the cells having the approximately perfect hexagonal shape is the cell other than cells of the approximately imperfect hexagonal shape. The skin layer and cell walls closed to the skin layer make the opening part of the cell of such an approximately imperfect hexagonal shape. The outer peripheral surface of a hexagonal cell honeycomb structure body is covered with the skin layer.

As previously described, the hexagonal cell honeycomb structure body according to the present invention satisfies the relationship Dax/P≧0.13 . . . (1), where P is the cell pitch P, and Dax is the average diameter of diameters of inscribed circles. Each of the inscribed circles is inscribed in a boundary part of openings of three cells, namely, at a junction area between adjacent three basic cell walls which form the three cells.

When does not satisfying the above relationship Dax/P≧0.13 . . . (1) is not satisfied, it is difficult to adequately increase the breaking strength of the hexagonal cell honeycomb structure body.

Figure 7:
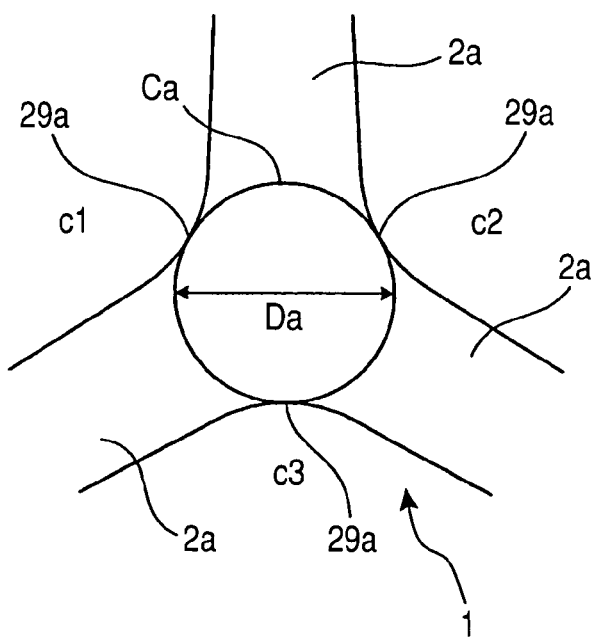
FIG. 7 is an explanatory view showing a diameter Da of an inscribed circle at a junction area of basic cell walls, and a shape of a surface of the cell wall.

FIG. 7 is an explanatory view showing the diameter Da of an inscribed circle in the basic cell wall 2a, and a shape of a surface of the cell wall 2a in the hexagonal cell honeycomb structure body 1.

As shown in FIG. 7, the circle Ca is firstly drawn at the boundary area of opening parts of adjacent three cells c1, c2, and c3 at a junction area between the basic cell walls 2a, namely, at a surface area of the adjacent basic cell walls 2a in the hexagonal cell honeycomb structure body 1. The diameter Da of the inscribed circle Ca is then obtained. Although the position where the inscribed circle Ca and the boundary part between the openings of the adjacent three cells c1, c2, and c3 are connected is changed according to fluctuation of a fine shape of each of the inside angle parts 29a at the junction, a maximum circle which is inscribed at the boundary part of the openings of the three cells c1, c2, and c3 is determined.

In addition, the average value Dax is an average value of the diameters Da at all of the junctions between the basic cell walls.

As described above, the surface of the basic cell wall has a concave shape which is curved toward the inside direction of the basic cell wall. having the concave part toward the direction of the inside of the basic cell wall indicates satisfying the above relationship (1) between the average value Dax and the cell pitch P, and further indicates that the curved surface of the basic cell wall is positioned at the inside area observed from the hypothetical straight line A when the surface of the basic cell wall is flat (shown in FIG. 3).

It is possible for the surface of the basic cell wall to have a circular arc shape, or a curved-like shape composed of a plurality of small straight lines connected to each other.

Further, as described above, the inside angle part formed by the surfaces of the adjacent two basic cell walls has a straight line shape or a curved shape to smoothly connect those surfaces of the adjacent two basic cell walls.

The phrase "smoothly connecting the surfaces of the adjacent two basic cell walls in a straight line shape or a curved shape indicates, namely, as if the surface of the inside angle part 29a has a convex shape, that the relationship (1) between the average value Dax and the cell pitch P is satisfied, and the surface of the inside angle part 29a is positioned at the outside (at the central point side of the hexagonal shaped cell) of the surface of the inside angle part when the surface of the basic cell wall has a straight line shape.

Still further, the inside angle part 29a is formed like a circular arc shape, or a curved shape composed of a plurality of small straight lines connected to each other, or formed with a straight line.

It is preferred that the hexagonal cell honeycomb structure body according to the present invention is made of cordierite ceramics.

That is, such ceramic cordierite is slightly lower in strength than another ceramics such as SiC. Having the structure of the basic cell walls according to the present invention can effectively increase the strength of the hexagonal cell honeycomb structure body when it is made of cordierite ceramics.

Still further, it is preferred that the surface of the basic cell wall has a rounded surface (R surface) of a circular-arc shape having the radius of curvature within a range of 1 to 32 mm, and the inside angle part between the adjacent basic cell walls has a rounded surface of a circular arc shape of a radius of curvature within a range of 0.1 to 0.4 mm, and a sum total of volumes of pores of not more than 40 μm diameter in the hexagonal cell honeycomb structure body is not more than 0.02 cm$^3$/g.

When the surface of the basic cell wall has the radius of curvature of less than 1 mm, there is a possibility of decreasing the breaking strength because of making it difficult to adequately maintain the thickness of the basic cell wall (in particular, the thickness of the minimum thickness part thereof).

On the other hand, when the surface of the basic cell wall has the radius of curvature of more than 32 mm, there is a possibility of increasing the total weight of the hexagonal cell honeycomb structure body, namely, making it difficult to decrease its total weight. This makes it difficult to obtain the function of rapidly activating catalysts, increase or improve the performance of purifying an exhaust gas, and decrease its pressure loss.

Still further, when the inside angle part formed by the surfaces of adjacent two basic cells has the radius of curvature of less than 1 mm, this makes it difficult to increase the breaking strength because of not diffusing and relaxing the stress generated in the inside of the hexagonal cell honeycomb structure body by the inside angle part.

On the other hand, when the inside angle part formed by the surfaces of adjacent two basic cells has the radius of curvature of more than 0.4 mm, this structure increases water absorption at the junction area between the basic cell walls because of increasing the volume of the junction area between the adjacent basic cell walls. When the basic cell walls is coated with a catalyst slurry during the production of the hexagonal cell honeycomb structure body, the junction area between the adjacent basic cell walls absorb the water component contained in the catalyst slurry. This makes it difficult to uniformly coat the catalyst slurry on the basic cell walls with high accuracy during the production of the hexagonal cell honeycomb structure body. Further, this causes a possibility of filling the cells with catalyst components.

In addition, it is sufficient to determine the radius of curvature of the surface and the inside angle part of the basic cell walls according to the number of meshes (which is the number of cells per unit area) and the thickness of the basic cell wall. For example, the allowable range of the radius of curvature of the inside angle part is determined by the radius of curvature of the surface of the basic cell because the hexagonal cell honeycomb structure body has a plurality of hexagonal shaped cells arranged in a honeycomb arrangement or checkered pattern. It is accordingly sufficient to determine the radius of curvature of the surface and the inside angle part of the basic cell within the above allowable range.

Figure 8A:
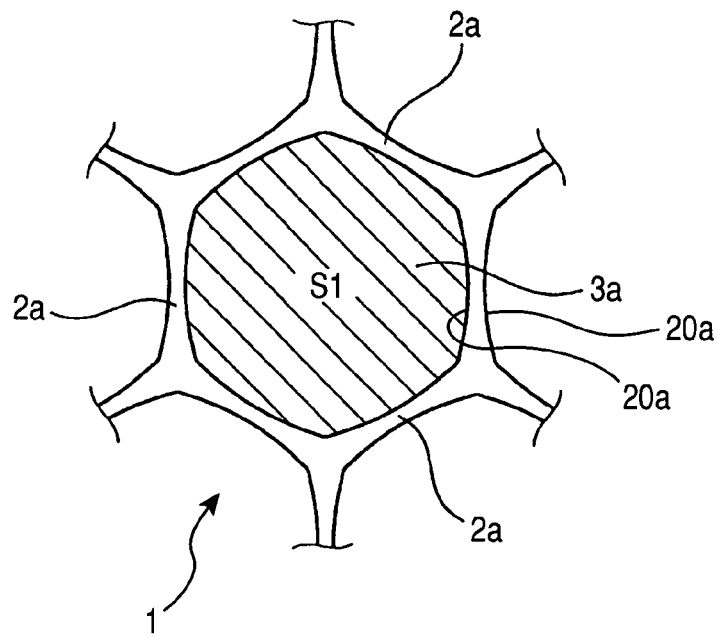
FIG. 8A is an explanatory view showing an area S1 of the opening part of a hexagonal shaped cell partitioned by basic cell walls on a cross section of the hexagonal cell honeycomb structure body according to the present invention.
Figure 8B:
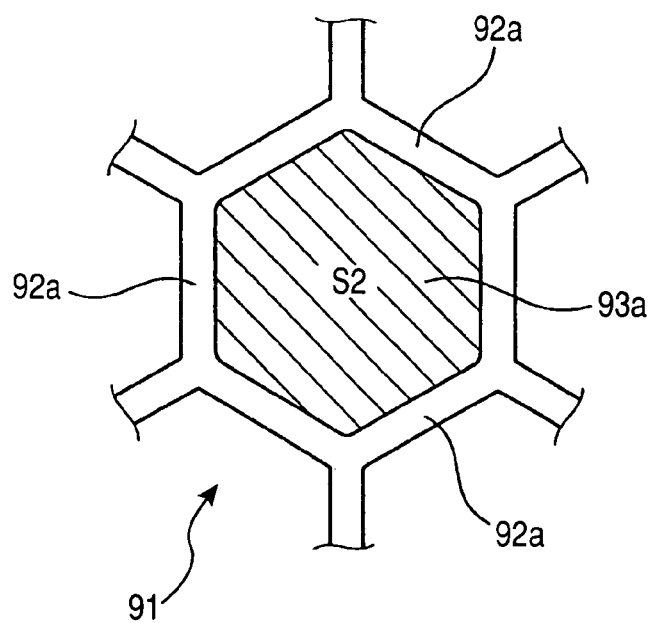
FIG. 8B is an explanatory view showing an area S2 of the opening part of a hexagonal shaped cell partitioned by cell walls on a cross section of a conventional hexagonal cell honeycomb structure body.

FIG. 8A is an explanatory view showing the area S1 of the opening part of a hexagonal shaped cell partitioned by the basic cell walls 2a on a cross section of the hexagonal cell honeycomb structure body 1 according to the present invention. FIG. 8B is an explanatory view showing the area S2 of the opening part of a hexagonal shaped cell partitioned by cell walls on a cross section of a conventional hexagonal cell honeycomb structure body.

When the radius of curvature of each of the surface and the inside angle part of the basic cell wall described above is determined, it is preferred to satisfy a relationship of S1≧S2, where S1 is an area of an opening part of each cell 3a partitioned or surrounded by six basic cell walls 2a in the hexagonal cell honeycomb structure body 1 according to the present invention in which the surface 20a of the basic cell wall 2a has a concaved shape toward the inside of the basic cell wall, and S2 is an area of an opening part of a cell 93a surrounded by six cell walls 92a in a conventional hexagonal cell honeycomb structure body in which the surface of the cell wall 92a has a flat shape or a straight line shape.

Satisfying the relationship of S1≧S2 achieves the function of rapidly activating catalysts and decreasing the total weight of the hexagonal cell honeycomb structure body while maintaining a high strength (such as isostatic strength). This structure of the hexagonal cell honeycomb structure body 1 according to the present invention can adequately increase or improve the capability of purifying an exhaust gas, and decreasing its pressure loss.

When the total volume of pores having not less than 40 μm diameter is more than 0.02 cm$^3$/g in a hexagonal cell honeycomb structure body, there is a possibility of making it difficult to adequately maintain the breaking strength of the hexagonal cell honeycomb structure body.

It is preferred for the hexagonal cell honeycomb structure body to have a porosity of not more than 40%. The porosity of the hexagonal cell honeycomb structure body can be detected by Mercury intrusion method using a Porosimeter.

When the porosity is more than 40%, there is a possibility of making it difficult to adequately maintain the total strength of the hexagonal cell honeycomb structure body.

It is preferred for the hexagonal cell honeycomb structure body to have a lower limit of the porosity of 10% because of making it difficult to support an adequate amount of catalyst on the cell walls.

It is preferred that a thickness of a minimum thickness part in each of the basic cell walls is not less than 40 μm.

When the thickness of the minimum thickness part is less than 40 μm, this makes it difficult to adequately maintain the strength of the basic cell walls, and causes a possibility of decreasing the breaking strength of the entire of the hexagonal cell honeycomb structure body. Further, this makes it difficult to mold the hexagonal cell honeycomb structure body with high accuracy because the slit width of a metal die becomes narrow, and an adequate amount of raw material cannot be fed, where the metal die is used during the extrusion and molding step of molding the raw material composed of cordierite ceramic. This case decreases the strength of the molded body after the extrusion molding step.

It is preferred that the thickness of the minimum thickness part is not more than 90% of a thickness of a maximum thickness part of the basic cell wall.

When the thickness of the maximum thickness part of the basic cell wall exceeds 90%, this structure makes it difficult to decrease the total weight of the hexagonal cell honeycomb structure body, and as a result, difficult to adequately increase the exhaust gas purifying function, and to adequately decrease the pressure loss.

It is preferred that the relationship between the average value Dax of the diameters Da of the inscribed circles and the cell pitch P satisfies Dax/P≧0.16. This structure makes it possible to further increase the breaking strength of the entire of the hexagonal cell honeycomb structure body.

When the relationship Dax/P between the average value Dax of the diameters Da and the cell pitch P is less than 0.16 (Dax/P<0.16), this structure makes it difficult to adequately increase the breaking strength of the hexagonal cell honeycomb structure body. Because the more the total area of the opening parts of the cells is increased, the more the pressure loss decreases, it is preferred to have the relationship Dax/P of 0.30 (Dax/P=0.30).

Still further, it is preferred for the hexagonal cell honeycomb structure body to satisfy the relationship of Dbx/Dax≧1.05 . . . (2), where Dax is the average value of the diameters of the inscribed circles, and Dbx is an average value of diameters Db of inscribed circles which are inscribed at the boundary area of opening parts of cells, (a) at a junction area between most outside peripheral cell walls closed of the skin layer, each of the most outside peripheral cell walls and the skin layer form an approximately imperfect hexagonal shaped cell, or (b) at a junction area between the most outside peripheral cell walls and the basic cell walls which form an approximately imperfect hexagonal shaped cell.

Satisfying the above relationship (2) increases the breaking strength of the hexagonal cell honeycomb structure body because the satisfaction of the relationship (2) (Dbx/Dax≧1.05) can increase the strength of the area near the outer peripheral surface when compared with the strength of the inside area of the outer peripheral surface in the hexagonal cell honeycomb structure body. The more the strength of the outer peripheral surface is increased, the more the entire strength of the hexagonal cell honeycomb structure body is drastically increased. This also increases the breaking strength of the hexagonal cell honeycomb structure body. It is possible to detect the diameter Db and the average value Dbx by the same method of detecting the diameter Da and the average value Dax.

It is preferred for the most outside peripheral cell walls to have the same shape of the basic cell walls. That is, it is preferred for the surface of the most outside peripheral cell wall to have a curved shape which is concave toward the inside of the most outside peripheral cell wall. It is preferred for the inside angle part between the adjacent two most outside peripheral cell walls to have a straight line shape or a curved shape in order to smoothly connect the surfaces of those two most outside peripheral cell walls. This structure makes it possible to obtain the effects of the present invention such as the function of rapidly activating catalysts, the function of increasing the exhaust gas purifying performance, and the function of decreasing its pressure loss.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A hexagonal cell honeycomb structure body for use as a catalyst support capable of supporting catalysts capable of purifying an exhaust gas, comprising:
    a plurality of cell walls, each having a hexagonal lattice shape;
    a plurality of hexagonal shaped cells, each of which is surrounded by six cell walls; and
    a cylindrical skin layer with which the outer periphery of the hexagonal cell honeycomb structure body is covered,
    wherein an average thickness of each of the six basic cell walls is not more than 140 μm, where the six basic cell walls without including the cylindrical skin layer form a substantially-perfect hexagonal shaped cell, and
    a relationship Dax/P≧0.13 . . . (1) is satisfied, where P is a cell pitch P, and Dax is an average diameter of diameters of inscribed circles, and each of the inscribed circles is inscribed in a boundary part of opening parts of three cells at a junction area between adjacent three basic cell walls, and
    each of both surfaces of the basic cell wall is curved inside to form a concave shape, and an inside angle part between the adjacent two basic cell walls has a straight shape or a curved shape so that the surfaces of the adjacent two basic cell walls are smoothly connected together,
    wherein the surface of the basic cell wall has a rounded surface of a circular arc shape of a radius of curvature within a range of 1 to 32 mm, and the inside angle part between the adjacent two basic cell walls has a rounded surface of a circular arc shape of a radius of curvature within a range of 0.1 to 0.4 mm, and a total sum of volumes of cores of not less than 40 μm diameter in the hexagonal cell honeycomb structure body is not more than 0.02 $cm^3/g$.

2. The hexagonal cell honeycomb structure body according to claim 1, wherein the hexagonal cell honeycomb structure body is made of cordierite ceramics.

3. The hexagonal cell honeycomb structure body according to claim 1, wherein a thickness of the minimum thickness part in each of the basic cell walls is not less than 40 μm.

4. The hexagonal cell honeycomb structure body according to claim 1, wherein the relationship between the average value Dax of the diameters Da of the inscribed circles and the cell pitch P is Dax/P≧0.16.

5. The hexagonal cell honeycomb structure body according to claim 1, wherein a relationship of Dbx/Dax≧1.05 . . . is satisfied, where Dax is the average value of the diameters of the inscribed circles at the boundary area of opening parts of the basic cell walls, and Dbx is an average value of diameters Db of inscribed circles which are inscribed at the boundary area of opening parts of cells,
    at a junction area between most outside peripheral cell walls closed of the skin layer, each of the most outside peripheral cell walls and the skin layer form an approximately imperfect hexagonal shaped cells, or
    at a junction area between the most outside peripheral cell walls and the basic cell walls which form an approximately imperfect hexagonal shaped cells.

* * * * *